United States Patent Office 3,582,274
Patented June 1, 1971

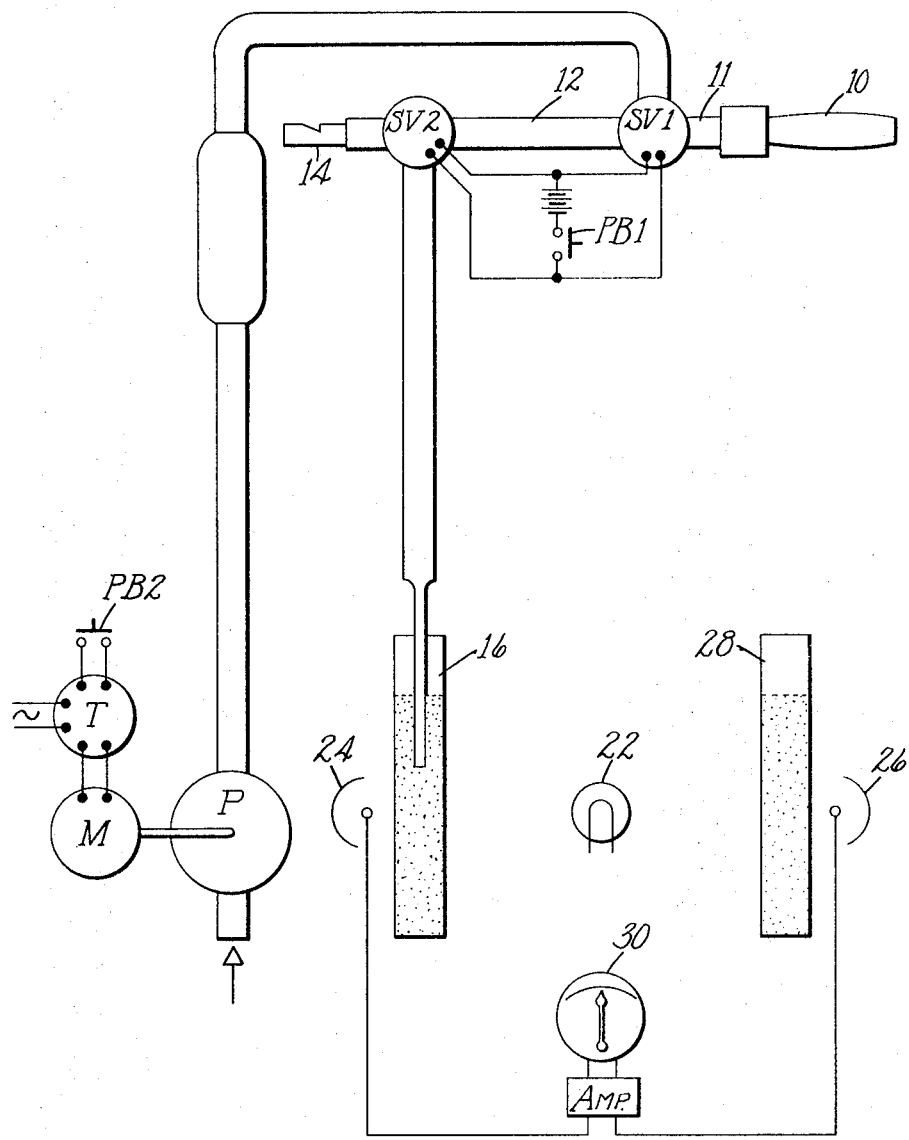

3,582,274
METHODS OF ANALYZING BREATH FOR ETHYL ALCOHOL
Frederick G. Keyes, 15 Berkeley St., Cambridge, Mass. 02138
Filed June 24, 1969, Ser. No. 835,943
Int. Cl. C09k 3/00; G01n 31/22, 33/16
U.S. Cl. 23—232
6 Claims

ABSTRACT OF THE DISCLOSURE

In the quantitative analysis for ethyl alcohol of a sample of breath by the method comprising contacting the sample with a solution of chromate ions and measuring the decrease of chromate ion concentration, the sample is contacted with a solution comprising a chromate compound in aqueous nitric acid. The oxidation reaction of breath alcohol with this solution has a rapidity suitable for every practical purpose in breath testing for alcohol.

BACKGROUND OF THE INVENTION

Field of the invention

This invention relates to improvements in methods for rapidly analyzing samples of expired air to determine the concentration therein of ethyl alcohol which concentration has a predetermined relation to the concentration of alcohol in the blood. More particularly, the invention relates to improvements in such methods wherein the determination of alcohol concentration is made by measuring the color change in a reactive solution.

Description of the prior art

In recent years the need for improved methods for rapidly analyzing the breath of individuals for alcohol has been abundantly manifested. In particular there is a rising need for quickly determining the concentration of alcohol in the blood of individuals suspected of operating motor vehicles while under the influence of alcohol.

This need has led to the development of various forms of portable apparatus for carrying out an analytical method in which a predetermined volume of breath is taken and then passed through a solution in a glass vial, the solution being reactive with any alcohol in the sample, or with a product produced thereby in the apparatus, to provide a color change in the solution which may be measured, suitable photometrically, to determine the quantity of alcohol in the sample.

One of the several alcohol reactive solutions heretofore proposed for use in the method comprises a chromate salt in an aqueous solution of sulphuric acid. The reaction of ethyl alcohol with the chromate salt in such a solution is relatively slow. Accordingly, to achieve a more satisfactory speed of reaction it has been further proposed to add to such a sulphuric acid solution of chromate salt a catalyst for the reaction.

Although the use of certain catalysts are effective in speeding up the color changing reaction, it is obviously desirable to eliminate entirely the need for an additional component of the solution, particularly where the added component increases the expense of the solution.

SUMMARY OF THE INVENTION

It is accordingly an object of the invention to provide an improvement in methods of rapidly analyzing a breath sample for ethyl alcohol by reaction thereof with a chromate compound in an aqueous acid medium, which improvement will obviate the need for a reaction catalyst in order to achieve a speed of analysis suitable for all practical use.

To this end and in accordance with the present invention, an improvement in methods for rapidly analyzing a breath sample for ethyl alcohol is provided in which the sample is contacted with a chromate compound in aqueous nitric acid, the concentration of the acid falling within a prescribed range. I have found, surprisingly, that where the chromate compound is employed in such an aqueous nitric acid environment rather than in a sulphuric acid environment, the reaction is self-catalyzing and proceeds to a degree of completion sufficient for analytical determination of the true alcohol content of the sample within a time interval sufficiently short for every practical use. For example, when employed in an apparatus known as the ALCOMETER Breath Analyzer Model D-1 which is adapted for an analytical cycle of 3.7 minutes, the reaction reaches such substantial completion within this period as to provide a stable maximum reading and thus promote the dependability and the acceptability of the analytical results made therewith. Further, this result is achieved without the introduction of heat or extraneous catalytic means.

BRIEF DESCRIPTION OF THE DRAWING

The figure represents a diagram of apparatus adapted to carry out the method of the present invention.

DESCRIPTION OF THE PREFERRED EMBODIMENT

As an aid in understanding the improved method provided by the present invention, the method is herein illustrated and described as it is carried out using the diagrammed apparatus. Referring to the figure, the apparatus has a mouthpiece 10 communicating, close up through a flexible breathing tube 11, with a sample chamber 12 disposed between two solenoid valves SV1 and SV2 controlled by a push button PB1. When the latter is depressed, the valves are actuated to permit the subject's breath to pass from the mouthpice through the chamber 12 and out through a whistle 14. When the whistle signal begins to weaken, the button PB1 is released and the valve SV1 and SV2 cut off the mouthpiece and whistle from the chamber 12 and connect the latter beteween an air pump P and a bubble tube. A button PB2 is then pressed starting a timer T controlling a motor M connected to the pump P causing the latter to supply air, purified and dried by silica gel and steam activated charcoal, to flush the breath sample into a test vial 16 during a flushing cycle of 3.7 minutes. A chemical reaction then takes place within the vial causing the color of the indicator solution to be reduced in intensity in accordance wtih the amount of alcohol in the sample. Suitably and as illustrated, the color change is measured photometrically by means comprising a light source 22 illuminating two photocells 24 and 26 along first and second separate paths, in one of which is disposed the test vial while in the second is disposed a vial 28 of standard color. A meter 30 is connected for deflection in accordance with the difference in output of the cells, said output being balanced at the start of the test by electrically zeroing the meter. If alcohol was present in the sample, the meter will indicate a reading on a scale that suitably has been calibrated in percent of alcohol in the blood. This reading is the result of the increased output of the photocell 24 in consequence of the reduced color of the test vial 12.

In carrying out the invention, I have found that the concentration of nitric acid has a useful range from about 35% to about 65% by weight $HNO_3$. Use of concentrations below the above range results in too slow a reaction while concentrations above 65% tend to bleach the solution. I prefer to use with most chromate compounds an acid solution comprising by weight about 49% $HNO_3$ (corresponding to 70% aqueous solution of commercial 69–71% $HNO_3$ nitric acid) since this provides the most complete oxidation reaction within a short interval suitable for on the spot tests, for example, during the period of the test cycle of the above described apparatus.

The concentration of chromate compounds for use in the test solutions has a readily determined useful range below or above which the solution has too weak a color or too strong a color which masks the results. For example, the useful range of concentration of potassium dichromate in the solution is from about .020% to about .040% by weight. The useful range of concentration for other chromate compounds is readily determined on the basis stated above.

Among the chromate compounds which are useful in my invention are chromic acid, chromium trioxide (chromic anhydride $CrO_3$), and the alkaline chromates including potassium dichromate, sodium dichromate, potassium chromate and sodium chromate.

This invention is illustrated by the following examples:

Example I.—A 0.035% solution of potassium dichromate in nitric acid was prepared by mixing:

| | Ml. |
|---|---|
| Nitric acid (69–71% $HNO_3$) | 350.0 |
| Distilled water | 146.5 |
| 5% solution of potassium dichromate | 3.5 |

Three millilitres of this solution were placed in a test vial which was then placed in the above described apparatus and the output of the photocells was balanced. A bottle of water-alcohol solution of known proportions was connected to the breathing tube of the apparatus and with the solenoid valves SV1 and SV2 energized air was aspirated through the solution driving vapor from the bottle into the sample chamber after which the valves were deenergized to trap in the chamber a 50 ml. sample of air corresponding to the breath of a subject having a blood alcohol content of 0.15%. The flushing cycle of the analysis was then initiated, bubbling the collected sample through the solution in the test vial. At the end of the 3.7 minute period of this cycle it was noted that the oxidation reaction was essentially complete as indicated by the fact that the reading of the meter had ceased to increase.

Example II.—A solution was prepared with the ingredients in the proportions by weight as follows:

| | Percent |
|---|---|
| Chromic anhydride ($CrO_3$) | 0.0238 |
| $H_2O$ | 29.9762 |
| Nitric acid (69–71% $HNO_3$) | 70.0 |

Three millilitres of this solution were put in a test vial, placed in the apparatus, and the procedures of Example I were carried through. Again by the end of the flushing cycle the reading of the meter had ceased to increase, indicating completion of the oxidation reaction.

Having thus described my invention, what I claim as new and desire to secure by Letters Patent of the United States is:

1. In the method of quantitatively analyzing a sample for ethyl alcohol comprising the steps of contacting the sample with an aqueous solution comprising a chromate compound and measuring the decrease in the concentration of chromate ion, the improvement which comprises contacting the sample with a solution comprising a chromate compound dissolved in an aqueous acid solution having a concentration of $HNO_3$ in the range of about 35% to about 65% by weight.

2. The method as defined in claim 1 in which the acid solution comprises essentially aqueous nitric acid.

3. The method as defined in claim 2 in which said nitric acid comprises about 49% $HNO_3$.

4. The method as defined in claim 1 in which the acid solution consists of aqueous nitric acid and comprises about 49% $HNO_3$.

5. The method as defined in claim 1 in which the chromate compound is chromic anhydride.

6. The method as defined in claim 1 in which the chromate compound is chromic anhydride and the acid solution comprises essentially nitric acid comprising about 49% $HNO_3$

References Cited

Vidic, E.: Chem. Abstr. 67, 1967, 105936w.

MORRIS O. WOLK, Primary Examiner

R. M. REESE, Assistant Examiner

U.S. Cl. X.R.

23—254; 252—408